United States Patent [19]

Matsumoto

[11] 4,200,911

[45] Apr. 29, 1980

[54] CONTROL OF THE FLOW RATE AND FLUID PRESSURE IN A PIPELINE NETWORK FOR OPTIMUM DISTRIBUTION OF THE FLUID TO CONSUMERS

[75] Inventor: Kuniaki Matsumoto, Kokubunji, Japan

[73] Assignee: Hitachi, Ltd., Japan

[21] Appl. No.: 844,123

[22] Filed: Oct. 20, 1977

[30] Foreign Application Priority Data

Oct. 20, 1976 [JP] Japan ............................ 51-124981

[51] Int. Cl.[2] ..................... G06F 15/20; G05B 13/02; G05B 7/06

[52] U.S. Cl. .................................. 364/105; 364/107; 364/510; 137/624.11

[58] Field of Search ............... 364/509, 510, 105, 106, 364/107; 137/561, 624.11

[56] References Cited

U.S. PATENT DOCUMENTS

| | | | |
|---|---|---|---|
| 3,555,251 | 1/1971 | Shavit | 364/107 |
| 3,582,621 | 6/1971 | Lawler | 364/107 |
| 3,601,588 | 8/1971 | Bristol | 364/106 |
| 3,878,376 | 4/1975 | Sholes, Jr. et al. | 364/509 |
| 3,949,207 | 4/1976 | Savary et al. | 364/107 |

OTHER PUBLICATIONS

Marlow et al.: Improved Design of Fluid Networks with Computers Journal of the Hydraulics Division Proceed. of the Am. Soc. of Civil Eng. Jul., 1966 p. 43/61.

Satoh Yoshihiko: Study and Control of Water Distribution Network of Japan Water Works Association, No. 446, Nov. 1971, p. 7/22.

*Primary Examiner*—Felix D. Gruber
*Attorney, Agent, or Firm*—Craig and Antonelli

[57] ABSTRACT

Method and apparatus for optimum distribution of water supplied to consumers is disclosed.

At selected nodes of a network from which water is supplied to consumers, the actual water consumption is measured to detect a standard pattern for water demand in each selected area. Next, predicted demand patterns for each and every node are determined by comparing the characteristics or attributes of each area with those of areas having standard demand patterns. Thirdly, manipulated variables of pumps and valves installed in the pipeline network are controlled on the basis of predicted demand patterns.

14 Claims, 8 Drawing Figures

FIG. 3A
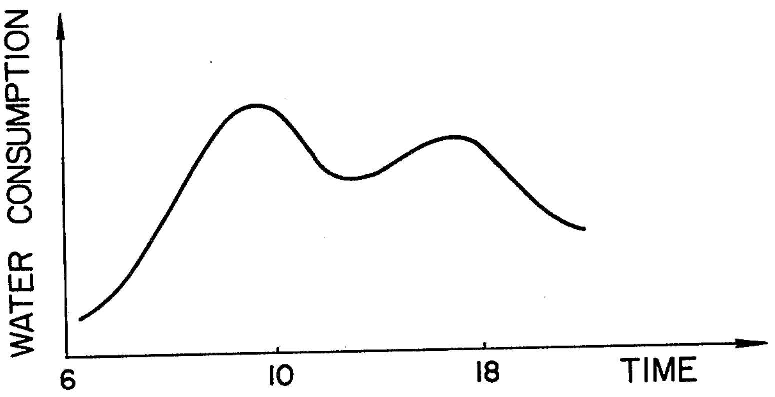
FIG. 3B
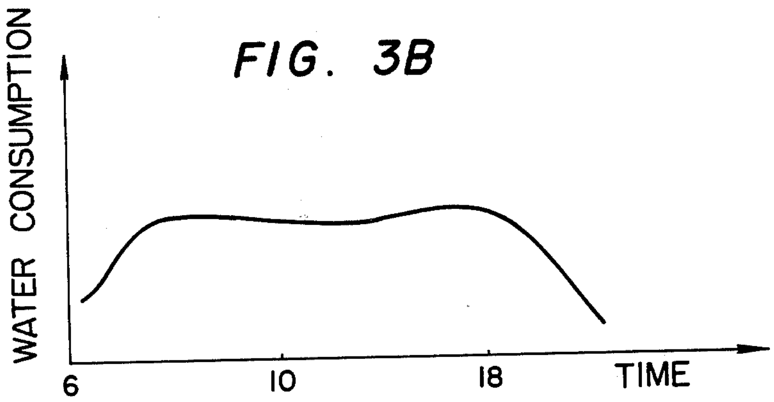
FIG. 4
| DEMAND ITEM Ri | THE NUMBER OF PEOPLE USING Ri | OCCUPATION RATE x(Ri) |
|---|---|---|
| $R_1$ = SCHOOL | $N_{R1}$ = 800 | $X(R_1) = 0.4$ |
| $R_2$ = SUPERMARKET | $N_{R2}$ = 600 | $X(R_2) = 0.3$ |
| $R_3$ = DEPARTMENT STORE | $N_{R3}$ = 200 | $x(R_3) = 0.1$ |
| ⋮ | ⋮ | ⋮ |
| | $N_T$ = 2000 | $X(R_1) + X(R_2) + \cdots + X(R_m) = 1$ |

FIG. 5
| Node | x(R1) | x(R2) | x(R3) | --- | x(Rm) |
|---|---|---|---|---|---|
| N1 | 0.4 | 0.1 | 0.2 | --- | 0.0 |
| N2 | 0.5 | 0.2 | 0.0 | --- | 0.1 |
| N3 | ⋮ | ⋮ | ⋮ | ⋮ | ⋮ |
| ⋮ | ⋮ | ⋮ | ⋮ | ⋮ | ⋮ |
| Nz | 0.1 | 0.1 | 0.2 | | 0.2 |
FIG. 6
| Node | x(R1) | x(R2) | --- | x(Rm) | $Q_{WDT}/Q_{HDT}$ | NORMALIZED STANDARD DEMAND PATTERN | |
|---|---|---|---|---|---|---|---|
| | | | | | | WEEKDAY | HOLIDAY |
| Nℓ | 0.5 | 0.2 | --- | 0.1 | 0.9 |  | 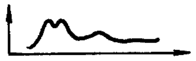 |
| Nm | 0.1 | 0.5 | --- | 0.2 | 1.5 | 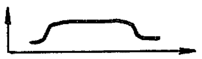 |  |
| ⋮ | ⋮ | ⋮ | ⋮ | ⋮ | ⋮ | ⋮ | ⋮ |

CONTROL OF THE FLOW RATE AND FLUID PRESSURE IN A PIPELINE NETWORK FOR OPTIMUM DISTRIBUTION OF THE FLUID TO CONSUMERS

BACKGROUND OF THE INVENTION

The present invention relates to a fluid supply system with a pipeline network. More particularly, the invention is directed to a method for providing an optimum distribution of fluid to all the consumers by controlling the flow rate and the fluid pressure in the pipeline network on the basis of the prediction of demand at nodes of the network.

Although the present invention is equally applicable to various kinds of fluid supply systems such as a water supply system and a fuel gas supply system, its application to a water supply system will be described for ease of explanation. As is well known, a water supply system comprises a large scale pipeline network connecting all the consumers to a water supply source including reservoirs and purification plant units.

In FIG. 1 showing this kind of pipeline network, numeral 1 denotes a reservoir from which water is supplied to consumers by way of a pipeline 2. Numeral 3 represents a flow meter for measuring the flow rate of the water in the pipeline 2. $N_1$, $N_2$, $N_3$ . . . $N_6$ represent nodes of the main pipeline network, from which water is supplied by way of individual pipelines to consumers living in areas or districts $D_1$, $D_2$, $D_3$ . . . $D_6$, respectively.

For example, all the consumers $n_{51}$, $n_{52}$ . . . $n_{5m}$ living in the area $D_5$ are supplied from the node $N_5$ by way of individual pipelines. Each node of the network in this figure is hereinafter referred to as a demand node.

Numerals 4, 5, and 6 represent valves each provided for controlling the flow rate in the pipeline between appropriate demand nodes, and numeral 7 denotes a pump placed in the pipeline between the demand nodes $N_1$ and $N_2$ to control the water pressure thereof.

Furthermore, Q(t) represents the amount of water changing with time (t), which is supplied from the reservoir 1, and $Q_{n1}(t)$, $Q_{n2}(t)$, . . . $Q_{n6}(t)$ represent the amounts of water demand changing with time (t) at nodes $N_1$, $N_2$ . . . $N_6$ respectively.

In order to optimize the distribution of water to the consumers, it is necessary to control the flow rate and water pressure by regulating the pumps and valves in the pipeline network in accordance with the amount of water demand at all the nodes.

A problem in this system is, of course, how to predict, with high accuracy, the demand for water at each node. Where a flow meter is provided at each demand node of the network to measure the total amount of water being supplied from each node to the individual consumers, a considerably accurate prediction of future demands will be made from data measured in the past. However, since there are usually as many as 100 to 500 nodes in a large scale pipeline network, it is difficult from an economical viewpoint to provide a flow meter and associated equipment for telemetering data at each node.

Meanwhile, on the side of consumers, individual flow rate indicators are provided for use in calculating water rates or charges based upon indications of water consumption.

In the prior art, the demand for water at each node was predicted using information related to the amount of water consumption in the past at each node, which is obtained from the sum of indications of individual flow indicators and data on the flow rate Q(t) supplied from the reservoir 1.

However, even operators having much experience and skilled in this art often are faced with difficulties in controlling the distribution of water because of the shortage of data necessary for the prediction of water demand at the nodes.

Moreover, this prior art technique, relying largely on the experience of a skilled person is disadvantageous from time and cost saving viewpoints.

The amount of water consumption changes depending greatly upon the characteristics or attributes of the districts or areas to which water is to be distributed, such as whether the district is residential area or public office area. Since the prior art technique does not consider such characteristics or attributes of areas, it is difficult to predict with high accuracy the demand for water at each node.

SUMMARY OF THE INVENTION

The object of the present invention is to provide a method for providing an optimum distribution of fluid to consumers on the basis of a considerably accurate prediction of demand at each node of the pipeline network.

In order to achieve the object, the present invention is characterized by the use of a processor such as a digital computer for the prediction of demand.

According to the present invention, several standard patterns for water demand are established from measurements of water consumption at selected nodes and information relative thereto is stored in the memory unit of the computer. Next, predicted demand patterns of each and every node are determined by comparing the characteristics or attributes of each area with those of areas having standard demand patterns.

Each area is regarded as having the same demand pattern as one of the standard demand patterns which is most similar in the characteristics or attributes of the area.

On the basis of the demand pattern thus obtained, the computer produces output signals indicative of manipulated variables of pumps and valves to control flow rate and water pressure in the pipeline network.

The objects and subject matter of the present invention will become more apparent from the following detailed description when read in conjunction with accompanying drawings.

BRIEF DESCRIPTION OF DRAWINGS

FIG. 4 is a table showing the characteristics or attributes of an area, FIGS. 5 and 6 are tables showing information relating to the characteristics of every area and standard demand patterns, to be stored in the memory.

PREFERRED EMBODIMENT OF THE INVENTION

Figure 1:
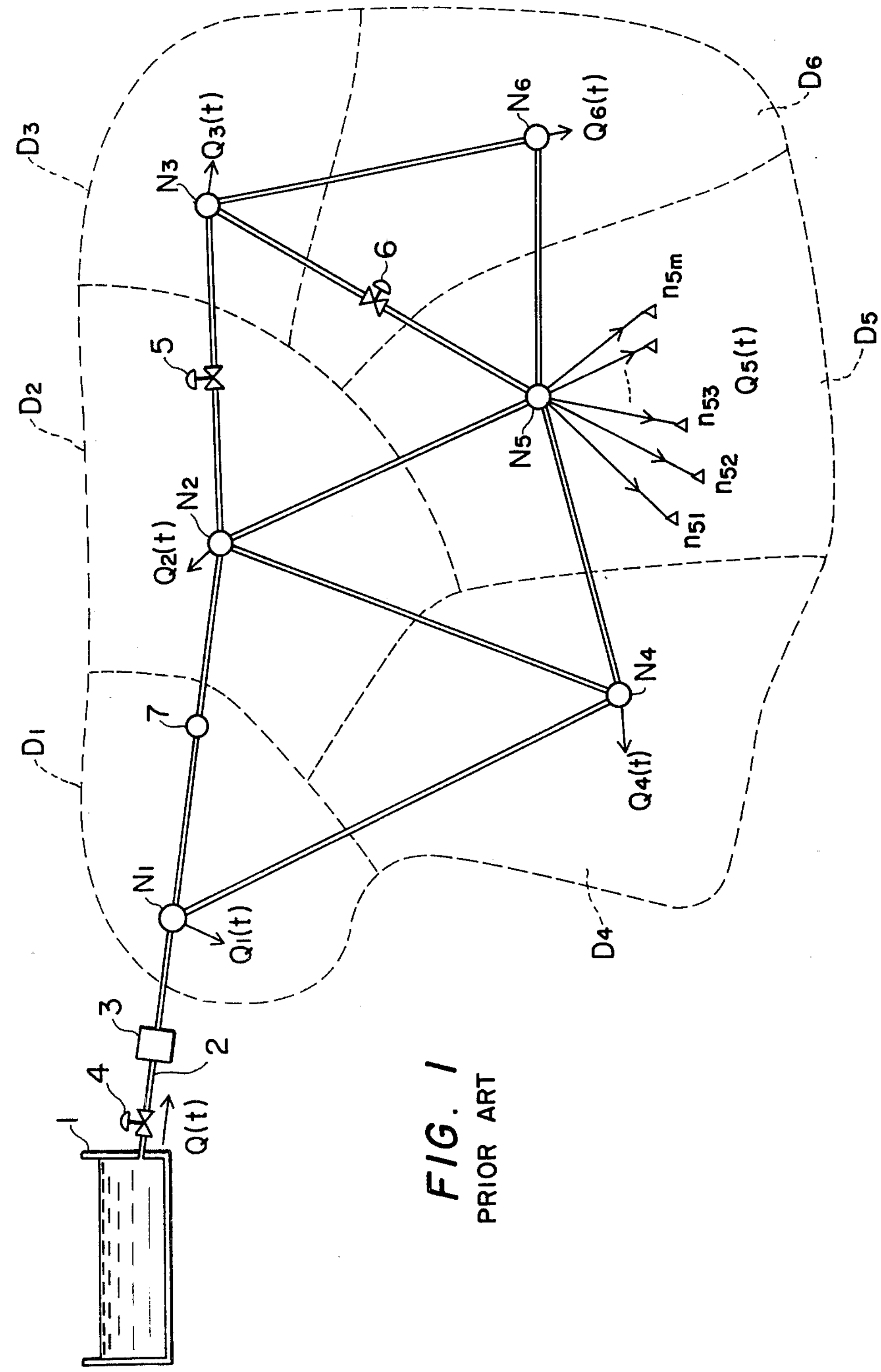
FIG. 1 PRIOR ART
FIG. 1 shows a schematic pipeline network for a water supply system.
Figure 2:
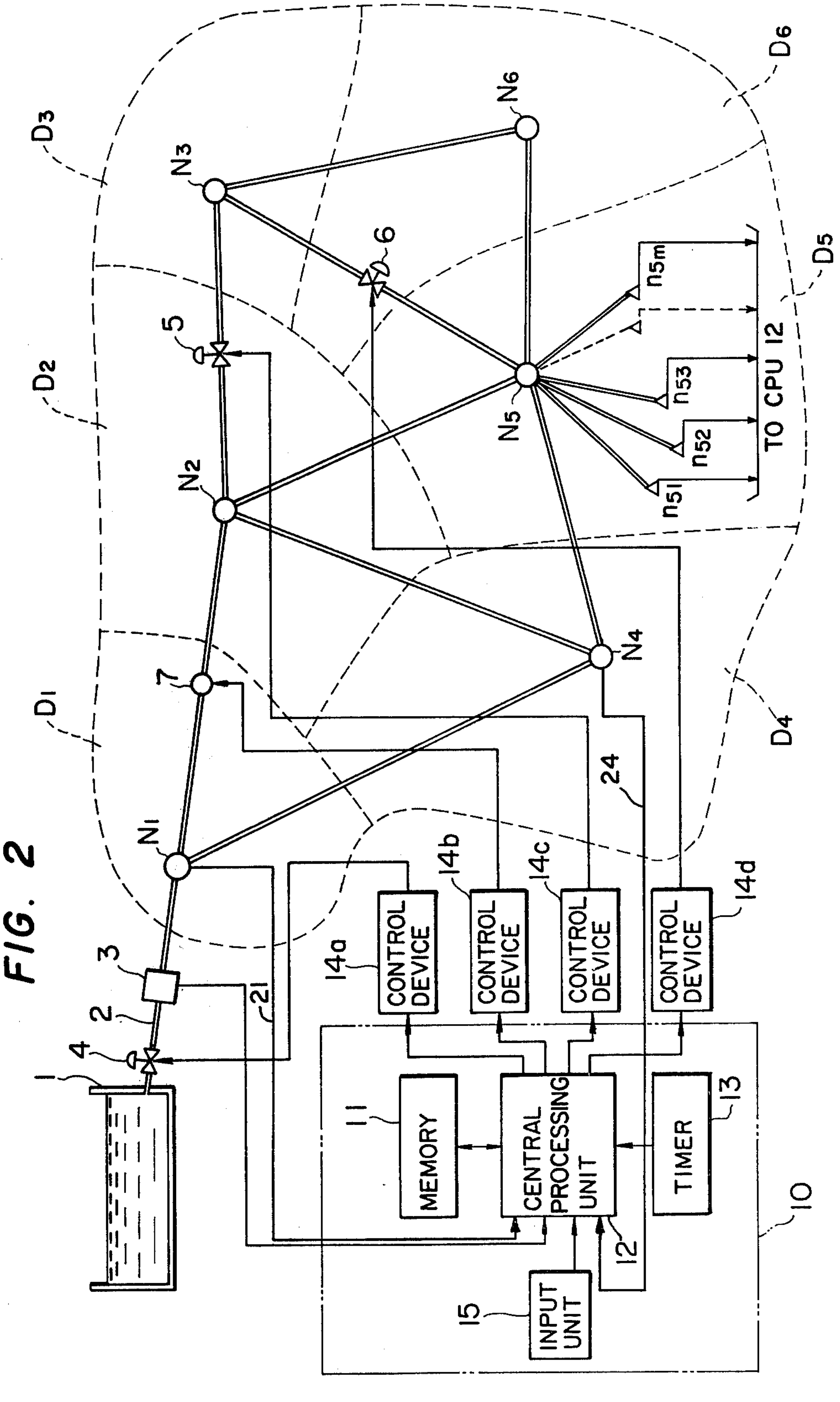
FIG. 2 shows an embodiment of the present invention adapted for control of the water supply system shown in FIG. 1, FIGS. 3A and 3B show exemplary patterns of water consumption in a residential area and a public office area.

Referring to FIG. 2, a central control unit 10 comprises a memory 11, a processing unit 12, a timer 13 and an input unit 15 connected to each other. The outputs of the central processing unit 12 are applied by way of control devices 14a, 14b, 14c, 14d to the valves 4, 5, 6 and the pump 7 installed at appropriate positions in the pipeline network.

The control of the flow rate and water pressure in the pipeline network is performed in accordance with the following steps (A), (B), (C), (D), and (E).

(A) Analysis of demand characteristics of each area

In general, the consumption of water in a residential area is quite different from that in a government and a public office area. FIGS. 3A and 3B illustrate consumption patterns, for these areas, in which the abscissa denotes time of day and the ordinate represents the amount of water consumption.

In the pattern for a residential area, usually there are peaks of water consumption at about 10 AM and 6 PM, as shown in FIG. 3A. It is noted that the amount of water consumption changes depending on the seasons, but the consumption pattern itself does not change.

On the other hand, water consumption for the government and public office area abruptly increases around 7 AM and maintains almost a constant level in daytime, while decreasing at night, as shown in FIG. 3B. It will be apparent from the foregoing discussion that each and every area may have a particular pattern of water consumption, which changes depending upon the purpose for the use of the buildings and houses, as well as the number of people using these buildings. In order to provide an optimum distribution of water to consumers, it is necessary to know such particular demand patterns inherent to each and every area.

For this purpose, the characteristics or attributes of an area must be investigated and analyzed. In this specification, the characteristics of an area are defined as a group of factors affecting the pattern for demand of water supplied to the area.

The demand pattern for each area has a close relationship with two main factors. One of them is for what purpose the buildings and houses in the area are used. They may be classified as schools, department stores, government offices, public offices, supermarkets, dwelling houses, etc. The other factor is the number of people using the thus classified buildings and houses. FIG. 4 is a table showing exemplary results of analyses on characteristics for an area, in which Ri represents the purpose for the use of the building; (hereinafter referred to as a demand item), $N_{Ri}$ the number of people using the building classified as a demand item Ri, and X(Ri) is the occupation rate. The occupation rate X(Ri) is defined as $$X(Ri)=N_{Ri}/N_T \qquad (1)$$

where $N_T$ is the total number of people using all the buildings in the area.

The demand characteristics of each area are expressed by Ri, $N_{Ri}$ and X(Ri).

(B) Determination of standard demand patterns

In the second step of the invention, some areas or districts are selected for determining the standard demand patterns. It is desired that these areas have an occupation rate X(Ri) different from each other, so that different curves of standard patterns can be obtained.

At each of the nodes of the selected areas, the amount of water supplied therefrom to consumers is actually measured. Thus, for example, choosing areas or districts D1 and D4 as the selected areas, suitable flow meters may be coupled to the pipeline system at nodes N1 and N4 and an indication of the water flow measured at these nodes may be supplied to central processing unit 12 via lines 21 and 24, respectively. The amount of water supplied changes with time of day; therefore, the pattern of consumption for each area can be obtained as a function of time. It is desirable, from the viewpoint of accuracy, to measure the consumption for several days, so as to obtain an average consumption pattern. This average consumption pattern is regarded as the future demand pattern for the area. Since the consumption on a weekday is usually much different in amount and pattern from that on a holiday, it is also desirable to measure it separately so as to obtain individual demand patterns.

For convenience of explanation, the demand patterns on weekdays and holidays for node $N_l$ (or area $N_l$) are denoted by $Q'_{nlW(t)}$ and $Q'_{nlH(t)}$ respectively. Then, normalized demand patterns $Q_{nlW(t)}$ and $Q_{nlH(t)}$ for the node $N_l$ are expressed as:

$$Q_{nlW(t)} = \frac{Q'_{nlW(t)}}{Q_{WDT}} \qquad (2)$$

$$Q_{nlH(t)} = \frac{Q'_{nlH(t)}}{Q_{HDT}} \qquad (3)$$

where $Q_{WDT}$ is the total amount of water consumption on a weekday, and $Q_{HDT}$ is the total amount of water consumption on a holiday.

The following relations, of course, exist between $Q'_{nlW(t)}$, $Q'_{nlH(t)}$ and $Q_{WDT}$, $Q_{HDT}$ respectively.

$$Q_{WDT} = \int_0^{24} Q'_{nlW(t)}dt \qquad (4)$$

$$Q_{HDT} = \int_0^{24} Q'_{nlH(t)}dt \qquad (5)$$

The normalized demand patterns thus obtained for selected nodes $N_l$, $N_m$, $N_n$ . . . are utilized as the standard demand patterns.

By performing the above-mentioned steps A and B, tables are obtained in the form, for example, shown in FIGS. 5 and 6.

(C) The determination of normalized demand pattern for each and every area

The next step to be performed is to determine normalized demand patterns for each and every area on the basis of standard demand patterns obtained in the manner discussed above.

For this purpose, data in the form of FIGS. 5 and 6 are stored by means of the input unit 15 into the memory unit 11.

Figure 7:
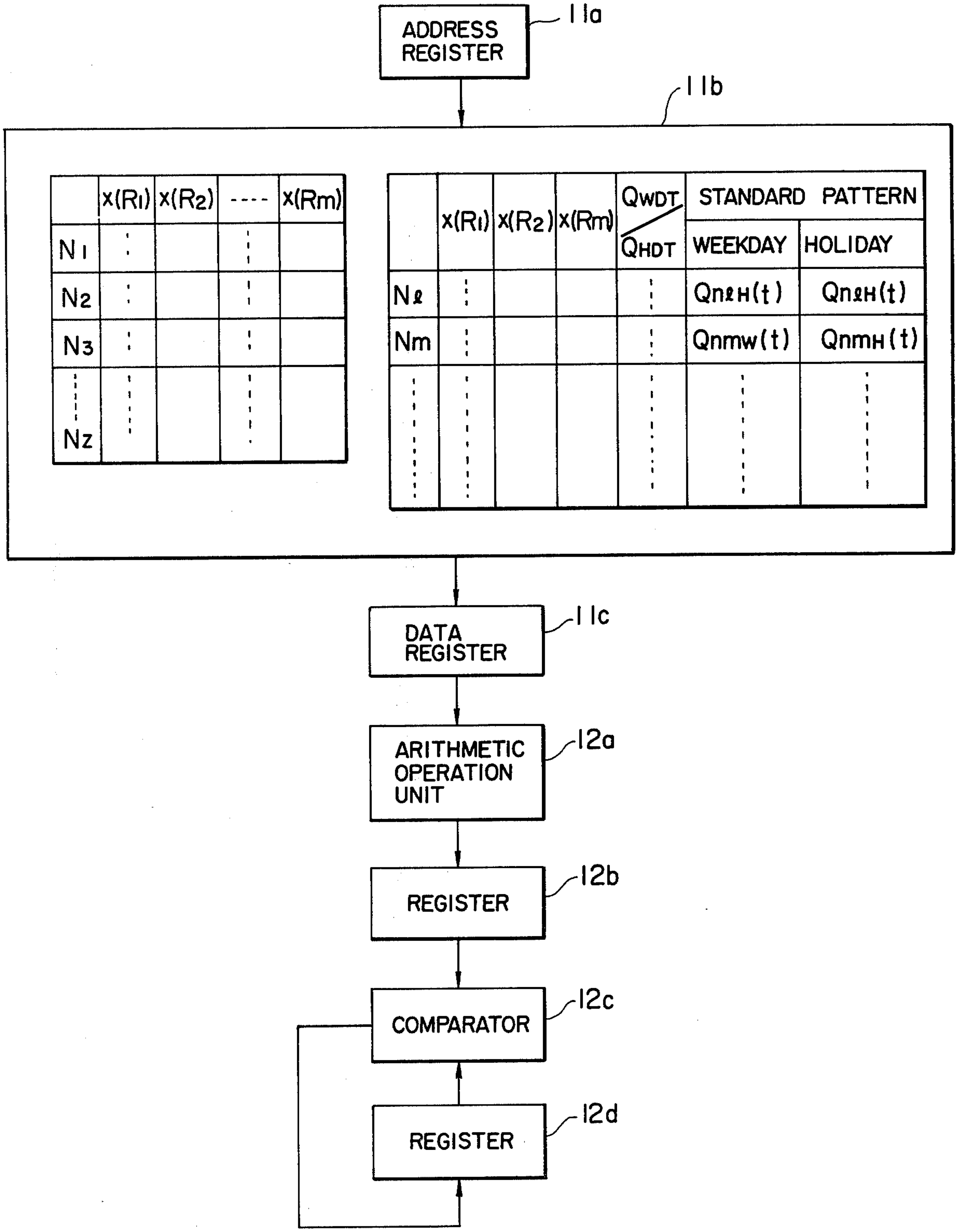
FIG. 7 is a block diagram showing the configuration for performing one of the operation of the present invention.

For purposes of an exemplary explanation, the determination of the demand pattern for the area $D_1$ will be described hereinafter by referring to FIGS. 2 and 7.

First of all, an address designating the node $N_1$ is stored in the address register 11*a* so that data on occupation rates $X_1(R_1)$, $X_1(R_2)$ . . . $X_1(R_m)$ are read out and temporarily stored in the data register 11*c*, whose output is introduced into the arithmetic operation unit 12c in the processing unit. Then, data on the occupation rates $X_l(R_1)$, $X_l(R_2)$, . . . $X_l(R_m)$ for the first standard area $D_l$ are read out and introduced into the arithmetic unit in a similar way. The arithmetic operation unit 12a executes the following operation to obtain the similarity $M_{1l}$ therebetween.

$$M_{1l} = \sum_{i=1}^{m} \{X_1(R_i) - X_l(R_i)\}^2 \quad (6)$$

The output indicative of the similarity $M_{1l}$ is then stored in the register 12b. A comparator 12c compares the contents of the register 12b with that of the register 12d and produces an output representative of the larger one to be stored in the register 12d. Therefore, the information of the similarity $M_{1l}$ is first stored in the register 12d.

Next, data on the occupation rates $X_m(R_1)$, $X_m(R_2)$, . . . $X_m(R_m)$ for the second standard area $D_m$ are read out of the memory unit 11b and applied to the arithmetic operation unit 12a. By this unit 12a, the similarity $M_{1m}$ between $X_1(R_i)$ and $X_m(R_i)$ is calculated in the same way as mentioned above. An output signal indicative of the similarity $M_{1m}$ is then compared with $M_{1l}$ stored in the register 12d. If $M_{1m} > M_{1l}$, the contents of the register 12d is replaced by $M_{1m}$. Likewise, the same operation is sequentially executed between the occupation rates of the area $D_1$ and those of the other standard areas in order to detect the particular standard area having the greatest similarity of the occupation rate.

The normalized standard pattern for such a standard area as having the greatest similarity with the area $D_1$ is approximately regarded as the normalized demand pattern for the area $D_1$.

Similarly, the other normalized demand patterns for areas $D_2$, $D_3$ . . . $D_z$ can be approximately determined.

(D) Determination of demand patterns for each and every area

In order to obtain the demand pattern for each area, the total amount of water demand per day $Q_{DT(N^K)}$ at each node $N_K$ must be known, in addition to the normalized demand pattern.

For this purpose, the amount of water consumption per month $Q_{MT(N^K)}$ at node $N_K$ is first obtained from the sum of the indications of flow rate indicators placed at individual consumers. For purposes of simplifying the system illustrated in FIG. 2, only the output leads 7l–7m of flow meters located at individual consumers or users $n_{51}$–$n_{5m}$ have been shown. The measured flow indications supplied over leads 7l–7m are coupled to central processing unit 12 to be used in obtaining the demand pattern for area D5. Thus, for node N5, central processing unit 12 sums the indications of the flow rate indications provided at customers $n_{51}$–$n_{5m}$ and stores this sum $Q_{MT}$ ($n_5$) in memory 11. Similarly, at the consumers served by nodes N1, N2, N3, N4, and N6 of the remaining areas D1, D2, D3, D4, and D6, the indications provided by the flow meters of the associated customers are coupled to central processing unit 12 over suitable leads, not shown, so that respective monthly sums for the remaining areas can be determined and held for further use in central control unit 10.

Secondly, information of the monthly consumption $Q_{MT(N^K)}$ at each node $N_K$ (K=1, 2, . . . , z) as well as the number of weekdays $D_W$ and the number of holidays $D_H$ in a month is stored in the memory unit 11 by way of input unit 15.

It should be understood that $Q_{MT(N^K)}$ is expressed as:

$$Q_{MT(N^K)} = D_W \cdot Q_{WDT(N^K)} + D_H \cdot Q_{HDT(N^K)} \quad (7)$$

where $Q_{WDT(N^K)}$, $Q_{HDT(N^K)}$ represent the total amount of water consumption on a weekday and a holiday at node $N_K$, respectively.

Furthermore, if the normalized demand pattern for the node $N_K$ *is determined to be substantially equal to one of the normalized standard demand patterns, for example* $Q_{nl(t)}$ at node $N_l$, the following relation exists between $Q_{WDT(N^K)}/Q_{HDT(N^K)}$ and $Q_{WDT(N^l)}/Q_{HDT(N^l)}$, $$Q_{WDT(N^K)}/Q_{HDT(N^K)} = Q_{WDT(N^l)}/Q_{HDT(N^l)} \quad (8)$$

Thirdly, the processing unit 12 reads out of memory unit 11 data on $Q_{MT(N^K)}$, $D_W$, $D_H$ stored in this step and $Q_{WDT}/Q_{HDT}$ of the standard nodes $N_l$, $N_m$ . . . as shown in table of FIG. 6 and executes the calculations to obtain $Q_{WDT(N^K)}$ and $Q_{HDT(N^K)}$ for each node $N_K$ (K=1, 2, 3, . . . z) on the basis of the equations (7) and (8). The results of the calculation are again stored in the memory unit 11.

Then, the processing unit 12 reads out information of the normalized demand patterns $Q_{nkW(t)}$, $Q_{nkH(t)}$ for weekdays and holidays at each node $N_K$ (K=1, 2, 3, . . . z) and the total amount of water consumption $Q_{WDT(N^K)}$, $Q_{HDT(N^K)}$, sequentially, and performs operations of $Q_{WDT(N^K)} \times Q_{nkW(t)}$ and $Q_{HDT(N^K)} \times Q_{nkH(t)}$ respectively so as to obtain the demand patterns for weekdays and holidays at each node $N_K$.

Information of these demand patterns thus obtained is again stored in the memory unit 11.

(E) Calculation of manipulated variables for pumps and valves

On the basis of a signal indicative of time, which is applied from the timer 13, the processing unit 12 reads out the amount of water demand for every node at a sampled time, to calculate manipulated variables for valves 4, 5, 6 and pump 7.

The calculation can be performed in a known manner if the amount of water demand at each and every node of the pipeline network is given.

One known method is as follows. In general, the relation between the flow rate and fluid pressure in the pipeline is expressed from Hazen-Williams's equation as follows.

$$Q_t(i,j) = 0.27853 C_{ij} D_{ij}^{2.63} \times \left( \frac{H_{ti} + P_{t(i,j)} - H_{tj} - V_{t(i,j)}}{L_{ij}} \right)^{0.54} \quad (9)$$

where $Q_{t(i,j)}$ is the flow rate of fluid, at a given time t, which flows from node $N_i$ to node $N_j$ through pipeline, $C_{ij}$ is the velocity coefficient of flow in a pipeline $T_{ij}$ connecting the two nodes $N_i$ and $N_j$, $D_{ij}$ is the diameter of pipeline $T_{ij}$, $L_{ij}$ is the length of pipeline $T_{ij}$, $H_{ti}$, $H_{tj}$ are the water heads (water pressures) at respective nodes $N_i$, $N_j$ at given time t, $P_{t(i,j)}$ is the water pressure at given time t increased by pump placed in pipe connecting nodes $N_i$ and $N_j$, when the water flows in the direction from node $N_i$ to node $N_j$, $V_{t(i,j)}$ *is the water pressure at given time t decreased by a value in pipeline connecting nodes* $N_i$ and $N_j$, when the water flows from node $N_i$ to node $N_j$.

From Kirchhoff's law the following equation exists at each and every node.

$$\sum_{i=1}^{n} Q_{t(i,j)} = Q_{jt} \qquad (10)$$

where $Q_{jt}$ is the demand at node $N_j$ at a given time t. On the other hand, the water head (water pressure) $H_i$ at demand node $N_i$ is usually desired to be about 1.5 atm. However, due to limitations of installation, the water pressure $H_i$ is restricted to such values as $$1.0 \text{ atm} \leqq H_i \leqq 5.0 \text{ atm} \qquad (11)$$

From well known methods, the values of $P_{t(i,j)}$ and $V_{t(i,j)}$ satisfying above-mentioned equations (9), (10), and (11) can be obtained with ease.

Among those values of $P_{t(i,j)}$ and $V_{t(i,j)}$ thus obtained, it is desirable to select particular values at which the number of times the pumps and valves are operated is minimized.

The processor 12 produces outputs corresponding to values $P_{t(i,j)}$ and $V_{t(i,j)}$ thus obtained, which are applied by way of respective control devices 14a~14d to the valves 4, 5, 6 and the pump 7.

It should be noted that the above explanation relative to an exemplary embodiment and some variations and improvements can be made without departing from the essential features of the present invention.

For example, the data on flow rate $Q_{(t)}$ measured by means of the flow meter 3 can be utilized for the correction of demand patterns for each node.

For this purpose, a correction coefficient $Q_t/\hat{Q}_t$ is obtained from the measured flow rate $Q_t$ and the total amount of water demand $\hat{Q}_t$ at a given time t, which is obtained from the sum of water demands at all the nodes by referring to every demand pattern. The correction of each demand pattern can be made by multiplying the amount of water demand at a given time by the correction coefficient $Q_t/\hat{Q}_t$ thus obtained.

Although the flow meter 3 is provided in the pipeline connecting the reservoir 1 and the node $N_1$, such a meter may be provided at any node to measure the amount of water supplied from the node to consumers.

It is evident that the use of many flow meters rather than only one meter may contribute to a more accurate correction of the demand patterns.

Moreover, while the present explanation is directed only to a water supply system, the same concepts above mentioned are applicable to a sewer system and electric power supply system.

According to the method of the present invention, the amount of water demand at each and every node is predicted with high accuracy, so that the flow rate and water pressure in the pipeline network can be controlled so as to provide an optimum distribution of water to all the consumers.

Moreover, the number of personnel and time necessary for control of the distribution of water is remarkably reduced as compared to the prior art method.

I claim:

1. A method of controlling the distribution of physical phenomena to users of said phenomena over an interconnected multinode distribution network comprising the steps of:
(a) measuring the user consumption of said phenomena at selected nodes and generated therefrom a set of respective normalized patterns of consumption of said physical phenomena;
(b) generating a plurality of normalized user demand patterns associated with each of the nodes of said interconnected multinode distribution network in accordance with prescribed user characteristics associated with each node;
(c) measuring the total consumption of said physical phenomena over a prescribed interval of time for each node of said network;
(d) assigning, to each node in said network, a respective one of said normalized patterns of consumption, in accordance with a prescribed relationship between the normalized user demand pattern associated with said each node and the normalized user demand patterns associated with said selected nodes;
(e) producing, for each node, a respective predicted user consumption demand pattern in accordance with the total consumption measured in step (c) and the normalized patterns of consumption assigned to each node in step (d); and
(f) controlling the distribution of said physical phenomena over said interconnected multinode distribution network in accordance with the predicted user consumption demand patterns produced in step (d).

2. In an interconnected multinode distribution network, wherein prescribed physical phenomena are supplied to the users thereof located in a plurality of areas, each of which areas is served by a respective node of said multinode distribution network, said system including a central control unit having data inputs coupled to said nodes and to the locations of the users of said phenomena for receiving prescribed data representative of the consumption of said phenomena, and having a plurality of outputs coupled to distribution control units, disposed within said network, for controlling the delivery of said phenomena through said network to said users, said central control unit including a central processor unit and associated memory for processing data coupled thereto and generating, in accordance with the processing of the data, control signals to be supplied to said distribution control units, a method controlling the distribution of said physical phenomena to said users comprising the steps of:
(a) measuring the user consumption of said phenomena at selected nodes and supplying data representative thereof to said central control unit;
(b) generating and storing, in said central control unit, a set of respective normalized patterns of consumption of said physical phenomena in accordance with the data measured in step (a);
(c) generating and storing in said central control unit a plurality of normalized user demand patterns associated with each of the nodes of said network in accordance with prescribed user characteristics associated with each node;
(d) measuring the consumption of said phenomena for each user served by the nodes of said network and supplying data representative thereof to said central control unit;
(e) generating and storing, in said central control unit, quantities representative of the total consumption of said physical phenomena over a prescribed interval of time for each node of said network in accordance with the data measured in step (d);

(f) assigning, for each node in said network, a respective one of the normalized patterns of consumption generated in step (b) in accordance with a prescribed relationship between the normalized user demand pattern associated with said each node and the normalized user demand patterns associated with said selected nodes;

(g) producing, for each node of said network, a respective predicted user consumption demand pattern in accordance with the total consumption quantities generated in step (e) and the normalized patterns of consumption assigned to each node in step (f); and (h) generating control signals and supplying said control signals from said central control unit to said distribution control units to thereby control the distribution of said physical phenomena over said interconnected multinode distribution network in accordance with the predicted user consumption demand patterns produced in step (g).

3. The method of controlling an interconnected multinode distribution network according to claim 2, wherein said network is made up of a plurality of nodes $N_k$ (where k=1, 2, 3 . . . z), each of which is located in a respective area of physical phenomena demand $D_k$ (where k=1, 2, 3, . . . z), each demand area containing plural demand items $R_i$ (where i=1, 2, 3, . . . m) by way of which the users of said network consume said physical phenomena and wherein step (c) includes supplying to said central control unit data representative of the occupation rate $X_{nk}(R_i)$ for each respective demand area $D_k$, the occupation rate $X_{nk}(R_i)$ being obtained as the ratio of the number of users $N_{Ri}$ associated with demand item $R_i$ to the total number of users $N_T$ in demand area $D_k$ to which said physical phenomena is supplied from node $N_k$.

4. The method of controlling an interconnected multinode distribution network according to claim 3, wherein step (f) comprises:

($f_1$) sequentially comparing the occupation rate $X_{nk}(R_i)$ with occupation rates $X_{nl}(R_i)$, $X_{nm}(R_i)$ . . . $X_{nn}(R_i)$ for the demand areas served by said selected nodes;

($f_2$) determining which occupation rate has the greatest similarity to occupation rate $X_{nk}(R_i)$; and ($f_3$) assigning that normalized pattern for consumption generated in step (b) which is associated with the demand area having the greatest similarity in comparison of occupation rate determined in step ($f_2$).

5. The method of controlling an interconnected multinode distribution network according to claim 4, wherein said network is a fluid conveying pipeline distribution network and said physical phenomena is a fluid.

6. The method of controlling an interconnected multinode distribution network according to claim 5, further comprising correcting the demand patterns for each node by performing the steps of:

(i) measuring the amount of fluid consumption at a node $N_i$ in said pipeline network;

(j) determining the ratio of the amount of fluid consumption measured in step (i) with that stored in said central control unit for said note $N_i$; and (k) correcting the stored patterns of consumption for each node $N_k$ in accordance with the ratio determined in step (j).

7. In a pipeline network system in which a network has a plurality of nodes $N_k$ (where k=1, 2, 3, . . . z), from which fluid is supplied to respective demand areas $D_k$ (where k=1, 2, 3, . . . z) each of which includes plural demand item $R_i$ (where i=1, 2, 3, . . . m) and means for controlling the network comprises pumps, valves, control devices for controlling the pumps and the valves and a control unit having a memory unit and a processor unit for performing necessary operations on the basis of data and information obtained from the network and supplying outputs to the control devices, wherein a demand pattern at the node $N_k$ is predetermined in the processor unit from the data and information stored in the memory unit and flow rate and fluid pressure in the network are controlled through the control devices to follow the predetermined demand pattern, a method for controlling the flow rate and fluid pressure in the pipeline network system, which comprises the steps of:

(a) inputting into the control unit the data and information on the occupation rate $X_{nk}(R_i)$ for the demand area $D_k$, the occupation rate $X_{nk}(R_i)$ being obtained as the ratio of the number of people $N_{Ri}$ in the demand item $R_i$ to the total number of people $N_T$ in the demand area $D_k$ to which the fluid is supplied from the node $N_k$;

(b) measuring the change of fluid consumption with time at each of demand nodes $N_l$, $N_m$ . . . N of some ones selected from among all the demand areas to obtain standard demand patterns $Q_{nl}(t)$, $Q_{nm}(t)$, . . . $Q_{nn}(t)$;

(c) sequentially comparing the occupation rate $X_{nk}(R_i)$ with those $X_{nl}(R_i)$, $X_{nm}(R_i)$, . . . $X_{nn}(R_i)$ for the selected demand areas to detect one of the occupation rates having the greatest similarity with $X_{nk}(R_i)$ so that the standard demand pattern for the selected demand area having the greatest similarity is used as the predetermined demand pattern for control of the demand area $D_k$;

(d) producing signals indicative of the amount of fluid demand at the node $N_k$ at any given time in accordance with the predetermined demand pattern; and (e) controlling manipulated variables of the pumps and the valves on the basis of the signals indicative of the amount of fluid demand.

8. A system of controlling the distribution of physical phenomena to users of said phenomena over an interconnected multinode distribution network comprising, in combination:

means for measuring the user consumption of said phenomena at selected nodes and generating a set of data representative of respective normalized patterns of consumption of said physical phenomena;

means for measuring the total consumption of said physical phenomena over a prescribed interval of time for each node of said network;

data processor unit which generates a plurality of data representative of normalized user demand patterns associated with each of the nodes of said interconnected multinode distribution network in accordance with prescribed user characteristics associated with each node, assigns, to each node in said network, a respective one of said normalized patterns of consumption, in accordance with a prescribed relationship between the normalized user demand pattern associated with said each node and the normalized user demand patterns associated with said selected nodes, and produces, for each node, a respective predicted user consumption demand pattern in accordance with the total measured consumption and the normalized patterns of consumption assigned to each node; and means for controlling the distribution of said physical phenomena over said interconnected multinode distribution network in accordance with said predicted user consumption demand patterns.

9. In an interconnected multinode distribution network, wherein prescribed physical pehnomena are supplied to the users thereof located in a plurality of areas, each of which areas is served by a respective node of said multinode distribution network, said system including a central control unit having data inputs coupled to said nodes and to the locations of the users of said phenomena for receiving prescribed data representative of the consumption of said phenomena, and having a plurality of outputs coupled to distribution control units, disposed within said network, for controlling the delivery of said phenomena through said network to said users, said central control unit including a central processor unit and associated memory for processing data coupled thereto and generating in accordance with the processing of the data, control signals to be supplied to said distribution control units, a system controlling the distribution of said physical phenomena to said users comprising, in combination:

first means for measuring the user consumption of said phenomena at selected nodes and supplying data representative thereof to said central control unit;

second means for measuring the consumption of said phenomena for each user served by the nodes of said network and supplying data representative thereof to said central control unit; and wherein, within said control unit, said central processor unit and its associated memory respectively generate and store a set of respective normalized patterns of consumption of said physical phenomena in accordance with the data measured and supplied by said first means, a plurality of normalized user demand patterns associated with each of the nodes of said network in accordance with prescribed user characteristics associated with each node, and quantities representative of the total consumption of said physical phenomena over a prescribed interval of time for each node of said network in accordance with the data measured and supplied by said second means, and wherein said central processor unit assigns, for each node in said network, a respective one of the normalized patterns of consumption generated in accordance with a prescribed relationship between the normalized user demand pattern associated with said each node and the normalized user demand patterns associated with said selected nodes, produces, for each node of said network, a respective predicted user consumption demand pattern in accordance with the total consumption quantities and the normalized patterns of consumption assigned to each node, and generates control signals in accordance with the predicted user consumption demand patterns; and wherein said control signals are supplied from said central processor unit to said distribution control units to thereby control the distribution of said physical phenomena over said interconnected multinode distribution network.

10. A system for controlling an interconnected multinode distribution network according to claim 9, wherein said network is made up of a plurality of nodes $N_k$ (where k=1, 2, 3, ... z), each of which is located in a respective area of physical phenomena demand $D_k$ (where k=1, 2, 3, ... z), each demand area containing plural demand items $R_i$ (where i=1, 2, 3, ... m), by way of which the users of said network consume said physical phenomena and wherein said central processor unit is supplied with data representative of the occupation rate $X_{nk}(R_i)$ for each respective demand area $D_k$, the occupation rate $X_{nk}(R_i)$ being obtained as the ratio of the number of users $N_{Ri}$ associated with demand item $R_i$ to the total number of users $N_T$ in demand area $D_k$ to which said physical phenomena is supplied from node $N_k$.

11. A system for controlling an interconnected multinode distribution network according to claim 10, wherein said central processor unit further:

sequentially compares the occupation rate $X_{nk}(R_i)$ with occupation rates $X_n(R_i)$, $X_{nm}(R_i)$ ... $X_{nn}(R_i)$ for the demand areas served by said selected nodes;

determines which occupation rate has the greatest similarity to occupation rate $X_{nk}(R_i)$; and assigns that normalized pattern of consumption which is associated with the demand area having the greatest similarity in comparison of occupation rate to that associated with a selected node.

12. A system for controlling an interconnected multinode distribution network according to claim 11, wherein said network is a fluid conveying pipeline distribution network and said physical phenomena is a fluid.

13. A system for controlling an interconnected multinode distribution network according to claim 12, further comprising:

means for measuring the amount of fluid consumption at a node $N_i$ in said pipeline network; and wherein said central processor unit determines the ratio of the amount of measured fluid consumption with that stored in said central control unit for said node $N_i$ and corrects the stored patterns of consumption for each node $N_k$ in accordance with said ratio.

14. In a pipeline network system in which a network has a plurality of nodes $N_k$ (where k=1, 2, 3, ... z), from which fluid is supplied to respective demand areas $D_k$ (where k=1, 2, 3, ... z) each of which includes plural demand items $R_i$ (where i=1, 2, 3, ... m) and means for controlling the network comprising pumps, valves, control devices for controlling the pumps and the valves and a control unit having a memory unit and a processor unit for performing necessary operations on the basis of data and information obtained from the network and supplying outputs to the control devices, wherein a demand pattern at the node $N_k$ is predetermined in the processor unit from the data and information stored in the memory unit and flow rate and fluid pressure in the network are controlled through the control devices to follow the predetermined demand pattern, a system for controlling the flow rate and fluid pressure in the pipeline network system, which comprises:

means for inputting into the control unit the data and information on the occupation rate $X_{nk}(R_i)$ for the demand area $D_k$, the occupation rate $X_{nk}(R_i)$ being obtained as the ratio of the number of people $N_{R_i}$ in the demand item $R_i$ to the total number of people $N_T$ in the demand area $D_k$ to which the fluid is supplied from the node $N_k$;

means for measuring the change of fluid consumption with time at each of demand nodes $N_l$, $N_m$, . . . $N_n$ of some ones selected from among all the demand areas to obtain standard demand patterns $Q_{nl}(t)$, $Q_{nm}(t)$, . . . $Q_{nn}(t)$; and wherein said processor unit sequentially compares the occupation rate $X_{nk}(R_i)$ with those $X_{nl}(R_i)$, $X_{nm}(R_i)$ . . . $X_{nn}(R_i)$ for the selected demand areas to detect one of occupation rates having the greatest similarity with $X_{nk}(R_i)$ so that the standard demand pattern for the selected demand area having the greatest similarity is used as the predetermined demand pattern for control of the demand area $D_k$, and produces signals indicative of the amount of fluid demand at the node $N_k$ at any given time in accordance with the predetermined demand pattern; and means for controlling manipulated variables of the pumps and the valves on the basis of the signals indicative of the amount of fluid demand.

* * * * *